June 28, 1960
L. MERKER
2,942,941
METHOD FOR THE PREPARATION OF MONOCRYSTALLINE ALUMINUM TITANATE
Filed Nov. 23, 1955
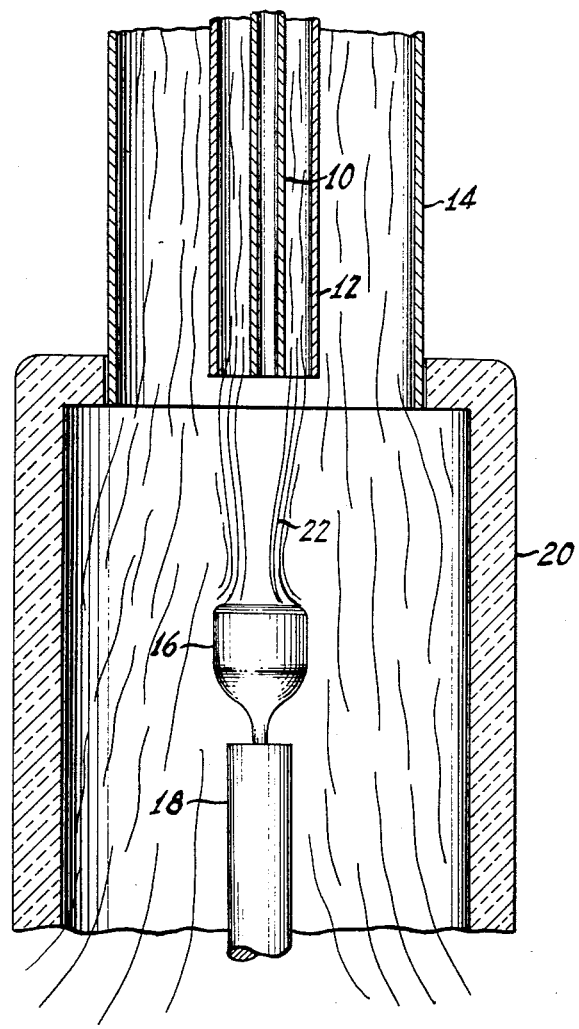
INVENTOR.
LEON MERKER
BY Robert L. Holiday
AGENT

2,942,941

**A METHOD FOR THE PREPARATION OF MONO-
CRYSTALLINE ALUMINUM TITANATE**

Leon Merker, Bronx, N.Y., assignor to National Lead Company, New York, N.Y., a corporation of New Jersey Filed Nov. 23, 1955, Ser. No. 548,612

2 Claims. (Cl. 23—51)

This invention relates in general to monocrystalline metal titanate. More specifically, it relates to monocrystalline aluminum titanate.

Many types of materials have been produced as sintered bodies which possess relatively high refractive indices. Among these sintered bodies are aluminum titanate. Such bodies are prepared in various ways by sintering powdered aluminum titanate material. Various advantages would be obtained if aluminum titanate could be prepared as transparent monocrystalline material instead of the well-known sintered form. During our investigations on production of single crystals, we have attempted to produce many types of single crystals and among those produced is the transparent monocrystalline aluminum titanate disclosed by the instant invention. This massive transparent monocrystalline aluminum titanate has not been prepared prior to the instant invention and has decided advantages over the multicrystalline sintered materials produced by the prior art.

An object of this invention, therefore, is to produce single crystals of aluminum titanate of commercially usable size and physical characteristics. Another object of this invention is to provide a process for producing such crystals. Still another object is to provide a simple and economical method for producing sizable aluminum titanate single crystals having commercial utility. These and other objects will become more apparent from the following more complete description of the instant invention.

Broadly, this invention contemplates monocrystalline aluminum titanate formed by crystallizing fused aluminum titanate particles. The present invention further contemplates the preparation of such monocrystalline aluminum titanate which comprises fusing finely divided aluminum titanate in an oxy-hydrogen flame and crystallizing the molten material to form a monocrystalline mass of aluminum titanate in the form of a boule.

The term "aluminum titanate" is intended to embrace both pure material and material which contains impurities, added coloring or modifying agents, either present or added, which are of a nature or in an amount as to not affect the monocrystalline structure nor alter desired color or physical properties of the monocrystalline material produced. In most cases the impurities are held to a minimum and ordinarily will not exceed a few tenths of a percent, and modifying the coloring agents are added in the amount necessary to produce the desired effect.

A preferred type of apparatus which may be successfully used in the instant invention is shown in the drawing and is similar in its general construction to that shown in application Serial No. 286,853, filed May 9, 1952, now abandoned, by Charles H. Moore, Jr., et al. and in Belgian Patent No. 491,522. In the apparatus shown in the drawing, the burner comprises three substantially concentric tubes 10, 12, and 14. The powdered aluminum titanate is introduced through the center tube 10 which with a portion of the oxygen and the remainder of the oxygen is introduced through the outermost tube 14. The hydrogen is introduced through the intermediate tube 12. The boule 16 is formed on a pedestal 18 of suitable refractory material such as alumina or zirconia and, as the boule grows, the pedestal 18 is lowered so that the top of the boule always remains at about the same location in the flame.

The boule 16 and top of the pedestal 18 are surrounded by a chamber 20 of alumina or the like and this chamber preferably surrounds the lower end of the outer tube 14. The gases are preferably fed at such rates that the flame fills and extends through the entire chamber 20 around the boule and in this way the temperature and other conditions around the boule are kept substantially constant. It has been found that smaller flames may be unsteady due to currents within the chamber and variations in the flame may cause damage to the boule.

In practice, the powdered aluminum titanate is generally introduced periodically into the pipe 10 with a minor portion of the oxygen, and the major portion of the oxygen is introduced through pipe 14. Hydrogen is introduced through the pipe 12 to provide the proper temperature and large flame. In one burner the oxygen in the inner pipe 10, the hydrogen in the intermediate pipe 12 and the oxygen in the outer pipe 14 are introduced in the proportions 2:10:13 respectively.

A cone 22 forms within the flame below the concentric tubes and the pedestal 18 is preferably positioned so that the molten top of the boule 16 is at or near the point of the cone 22. In order to form such a single crystal it is desirable, but not necessary, to first form a seed on the pedestal and then gradually build up the amount of molten material on the seed. Such a procedure allows the crystal to build up upon itself gradually increasing in diameter until a boule or carrot-shaped single crystal of aluminum titanate is formed. The size of the orifices of the oxygen-hydrogen torch determine the size of the intensely heated reaction zone which, in turn, determines the diameter of the carrot-shaped crystal produced.

In order to fuse the powdered mixture to form a boule it has been found that the temperature of the flame should be maintained somewhat above the melting point of the titanate feed material, but should not exceed a temperature at which the molten material tends to flow over the edges of the molten pool of material at the top of the boule. The flame temperature may be maintained by adjusting the quantity and rates of flow of both the hydrogen and oxygen gases but it is important that the flame be kept as constant and quiet as possible. The temperature should be held between about 1890° C. and 1975° C., preferably between about 1910° C. and 1940° C.

It is preferred to employ the titanate feed material in finely powdered form. The aluminum titanate feed material should be substantially free from objectionable or incompatible impurities which detrimentally affect the crystal structure, color or other properties of the crystal; and should be finely divided and fairly uniform in size. For most efficient results, the titanate feed material should possess an open structure with units capable of being rapidly melted, an especially satisfactory ultimate unit particle size of the material being less than 1 micron. Aggregates of these small particles greater than 100 mesh should also be avoided as they do not tend to melt completely. The feed material should be free-flowing in order to feed properly.

Using an oxygen-hydrogen burner having concentric orifices, the center orifice carrying the oxygen gas and powdered aluminum titanate feed material entrained in the oxygen, the outermost orifice carrying the rest of the oxygen gas, and the intermediate orifice carrying the hydrogen gas, a single crystal boule of aluminum titanate was prepared. The total gas flow of oxygen was 30 liters per minute, 4 liters through the center orifice and 26 liters through the outermost orifice, while the flow of hydrogen was 20 liters per minute. The boule was then subsequently annealed in an oxidizing atmosphere, such as air, for example, at a temperature between 650° C. and 1350° C. to remove the strains. The annealed boule possessed a clear, substantially colorless appearance. The time of annealing will vary depending upon the size of the boule and the temperature employed. However, it has been found that from 12 hours to 180 hours are satisfactory for producing relatively strain-free, transparent, substantially white crystals.

Such a transparent mass of monocrystalline aluminum titanate material has an average index of refraction of 2.0 and a Moh hardness value of 8.5. This single crystal material may be cut for use as optical devices, such as lenses, prisms and other optical products and novelty gems. Such material also has high resistance to thermal shock and therefore can be used as high temperature structural and bearing material.

From the above description, it is apparent that the present invention provides a transparent monocrystalline aluminum titanate having a high index of refraction and unusually high hardness. These single crystals of titanate composition are massive and therefore may be used for many purposes, including optical objects and high temperature structural material. The process is simple and economical to employ to produce massive monocrystalline material.

While this invention has been described and illustrated by the examples shown, it is not intended to be strictly limited thereto, and other modifications and variations may be employed within the scope of the following claims.

I claim:

1. Method for the preparation of monocrystalline aluminum titanate which comprises introducing powdered aluminum titanate feed material into a stream of oxygen, surrounding said stream of oxygen with a stream of hydrogen, surrounding said stream of hydrogen with a stream of oxygen and forming a flame having a central oxygen cone, and a surrounding oxidizing atmosphere around said flame melting said mixture in said flame and crystallizing into the form of a boule, the molten material adjacent the end of the oxygen cone.

2. Method according to claim 1 in which the crystallized material is subsequently annealed by subjecting the boule to an oxidizing treatment at a temperature from about 650° C. to about 1350° C.

References Cited in the file of this patent

UNITED STATES PATENTS

| 1,004,505 | Verneuil | Sept. 26, 1911 |
| 2,764,490 | Merker | Sept. 25, 1956 |

FOREIGN PATENTS

| 662,782 | France | Oct. 22, 1928 |

OTHER REFERENCES

Zerfoss et al.: "Single Crystal Growth of Scheelite," Physical Review, Jan. 15, 1949, page 320.

Chem. Abstract, vol. 48, 1954, pp. 1767d, 18i and 1333b.